(12) United States Patent
Armstrong

(10) Patent No.: US 9,163,863 B1
(45) Date of Patent: Oct. 20, 2015

(54) BEVERAGE TEMPERATURE CONTROL APPARATUS

(71) Applicant: Judith G. Armstrong, Staunton, VA (US)

(72) Inventor: Judith G. Armstrong, Staunton, VA (US)

(*) Notice: Subject to any disclaimer, the term of this patent is extended or adjusted under 35 U.S.C. 154(b) by 0 days.

(21) Appl. No.: 14/515,068

(22) Filed: Oct. 15, 2014

(51) Int. Cl.
  F25B 21/02 (2006.01)
  F25B 21/04 (2006.01)
  F25D 17/02 (2006.01)
  F25D 19/02 (2006.01)

(52) U.S. Cl.
  CPC .............. F25B 21/04 (2013.01); F25D 17/02 (2013.01); F25D 19/02 (2013.01)

(58) Field of Classification Search
  CPC .................................. F25B 21/04; F25D 19/02
  USPC ............. 62/3.62, 457.3, 457.5, 3.6, 3.3, 411, 62/186
  See application file for complete search history.

(56) References Cited

U.S. PATENT DOCUMENTS

| | | | |
|---|---|---|---|
| 4,183,226 A | 1/1980 | Moore | |
| 4,364,234 A * | 12/1982 | Reed | 62/3.3 |
| 4,719,764 A | 1/1988 | Cook | |
| 5,042,258 A * | 8/1991 | Sundhar | 62/3.2 |
| 5,653,124 A | 8/1997 | Weber | |
| 5,720,171 A * | 2/1998 | Osterhoff et al. | 62/3.6 |
| 5,970,719 A * | 10/1999 | Merritt | 62/3.6 |
| 6,000,224 A * | 12/1999 | Foye | 62/3.2 |
| 6,119,461 A * | 9/2000 | Stevick et al. | 62/3.64 |
| 6,155,063 A | 12/2000 | Felde | |
| 6,276,753 B1 | 8/2001 | Sur et al. | |
| 6,533,232 B1 | 3/2003 | Aggeler | |
| 6,640,551 B1 * | 11/2003 | Slone et al. | 62/3.61 |
| 6,732,533 B1 * | 5/2004 | Giles | 62/3.3 |
| 7,089,749 B1 | 8/2006 | Schafer | |
| 7,354,086 B2 | 4/2008 | Park | |
| 7,389,650 B2 | 6/2008 | Kukucka et al. | |
| 2007/0204629 A1 * | 9/2007 | Lofy | 62/3.61 |
| 2010/0186423 A1 * | 7/2010 | Veltrop et al. | 62/3.6 |
| 2010/0258268 A1 | 10/2010 | Li | |
| 2011/0192173 A1 * | 8/2011 | Walter et al. | 62/3.3 |
| 2012/0055180 A1 * | 3/2012 | Larson et al. | 62/80 |
| 2012/0217772 A1 | 8/2012 | Tang | |

* cited by examiner

*Primary Examiner* — Marc Norman
*Assistant Examiner* — David Teitelbaum
(74) *Attorney, Agent, or Firm* — Dale J. Ream

(57) ABSTRACT

A beverage temperature control apparatus for use in holding and maintaining a temperature of a beverage container includes a housing having a bottom wall, upstanding side walls, and a top wall extending across the side walls, the walls together defining an interior area. The top wall defines an aperture in communication with the interior area that is configured to receive the beverage container substantially into the interior area. A thermoelectric assembly is situated in the interior area of the housing proximate the opening, the thermoelectric assembly having a first portion that becomes cold when energized and a second portion that becomes warm when energized. A battery is situated in the interior area of the housing that is selectively actuated to energize the thermoelectric assembly. The thermoelectric assembly includes a primary channel configured to selectively cool the beverage container and a secondary channel configured to selectively heat the beverage container.

4 Claims, 10 Drawing Sheets

BEVERAGE TEMPERATURE CONTROL APPARATUS

BACKGROUND OF THE INVENTION

This invention relates generally to beverage cooling devices and, more particularly, to a beverage temperature control apparatus that can heat or cool beverage containers inside or remote from a vehicle.

Frequently, drivers and passengers of vehicles have cans of soda, cups of coffee, or fast food beverage containers with them in a vehicle. Modern vehicles have cup holders suitable for holding such beverage containers steady during travel to avoid spillage. However, the beverage containers do not keep the beverages at a consistent temperature which leads the driver or passenger to not finish all of the beverage or to do so despite a lack of enjoyment. In addition, keeping beverages warm or cool outside of a vehicle typically requires use of a cooler having been filled with bagged ice.

Various devices and proposals are known in the art for cooling beverages while in a car. Although assumably effective for their intended purposes, the existing devices and proposals are complicated and bulky, are tied to the air conditioning or heating systems of the car, or are not effective and portable for use inside or outside of an automobile.

Therefore, it would be desirable to have a beverage temperature control apparatus that receives one or more beverage containers in an automobile and maintains a temperature thereof. Further, it would be desirable to have a beverage temperature control apparatus that can selectively heat or cool a beverage container with the flip of a switch. In addition, it would be desirable to have a beverage temperature control apparatus that is configured to work both inside a car and remote from the car.

SUMMARY OF THE INVENTION

A beverage temperature control apparatus according to the present invention for use in holding and maintaining a temperature of a beverage container in or proximate an automobile includes a housing having a bottom wall and a plurality of side walls extending upwardly from the bottom wall and a top wall extending across upper edges of the plurality of side walls, the bottom, side, and top walls defining an interior area. The top wall defines an aperture in communication with the interior area that is configured to receive the beverage container substantially into the interior area. A thermoelectric assembly is situated in the interior area of the housing proximate the opening, the thermoelectric assembly having a first portion that becomes cold when energized and a second portion that becomes warm when energized. A battery is situated in the interior area of the housing that is electrically connected to the thermoelectric assembly and is selectively actuated to energize the thermoelectric assembly.

The thermoelectric assembly, also referred to as a Peltier cooling device, may include a primary channel having a circuitous tubular configuration that defines an interior space containing a fluid, said primary channel being situated adjacent said first portion of said thermoelectric assembly so as to be influenced by the cold temperature generated thereby. Further, the thermoelectric assembly may include a secondary channel diverging from said primary channel that defines an interior space containing a fluid, said second channel being situated adjacent said second portion of said thermoelectric assembly so as to be influenced by the heat generated thereby. A pair of gates regulate if the fluid (which may be air) is distributed only through the primary channel or diverted into the secondary channel. The gates are electrically connected to an input switch on the housing such that a user can determine whether to cool or to heat a beverage container situated in the housing.

Therefore, a general object of this invention is to provide a beverage temperature control apparatus having a housing that receives one or more beverage containers and maintains a cooled or heated temperature therein.

Another object of this invention is to provide a beverage temperature control apparatus, as aforesaid, having a thermoelectric assembly configured to selectively heat or cool a beverage container on demand.

Still another object of this invention is to provide a beverage temperature control apparatus, as aforesaid, having an internal battery configured to power a thermoelectric device when remote from an automobile and has a power cord configured to power the thermoelectric device when in the automobile.

Yet another object of this invention is to provide a beverage temperature control apparatus, as aforesaid, in which a thermoelectric assembly includes a primary channel having a fluid whose temperature is influenced by the cold side of a Peltier device and a secondary channel whose temperature is influenced by the hot side of a Peltier device.

A further object of this invention is to provide a beverage temperature control apparatus, as aforesaid, that is operable to heat or cool a beverage on demand both inside or remote from an automobile.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 6b is an isolated view on an enlarged scale taken from FIG. 6a;

DESCRIPTION OF THE PREFERRED EMBODIMENT

Figure 1A:
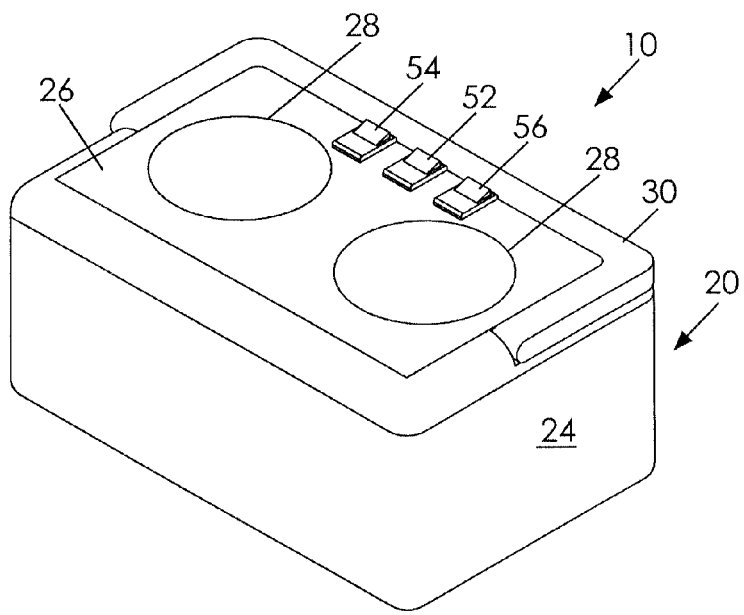
FIG. 1a is a perspective view of a beverage temperature control apparatus according to a preferred embodiment of the present invention illustrated with a handle in a stowed configuration.
Figure 1B:
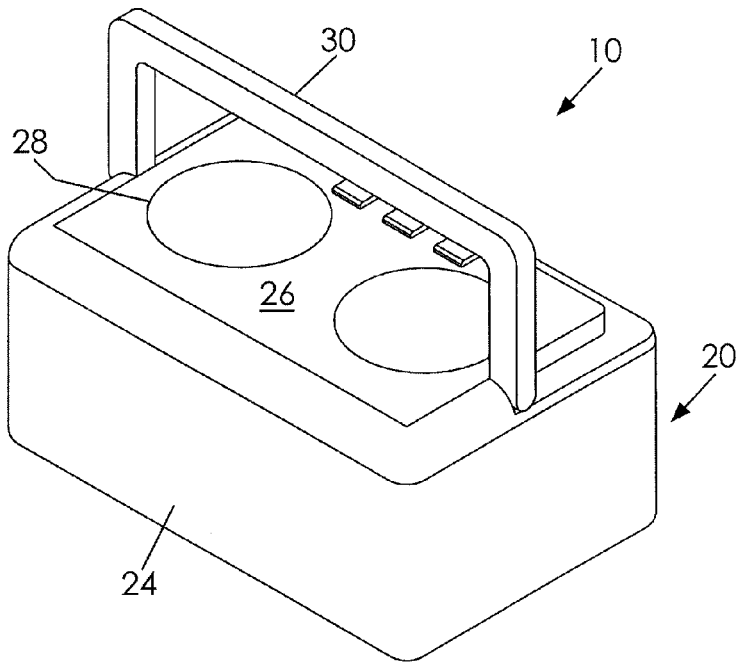
FIG. 1b is another perspective view of the apparatus as in FIG. 1b illustrated with the handle in an extended configuration.
Figure 2:
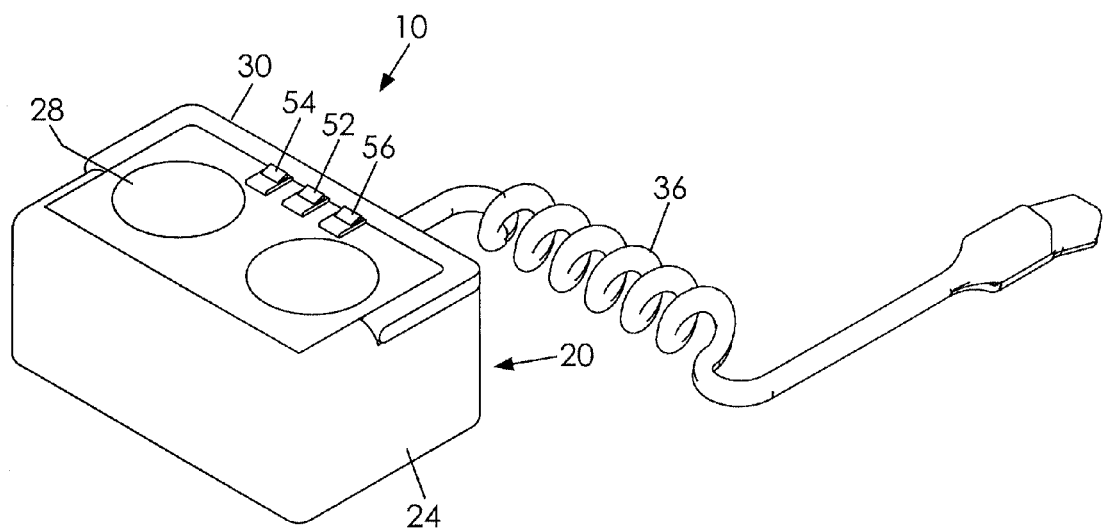
FIG. 2 is a perspective view of the apparatus as in FIG. 1b illustrated with an external power cord.
Figure 3:
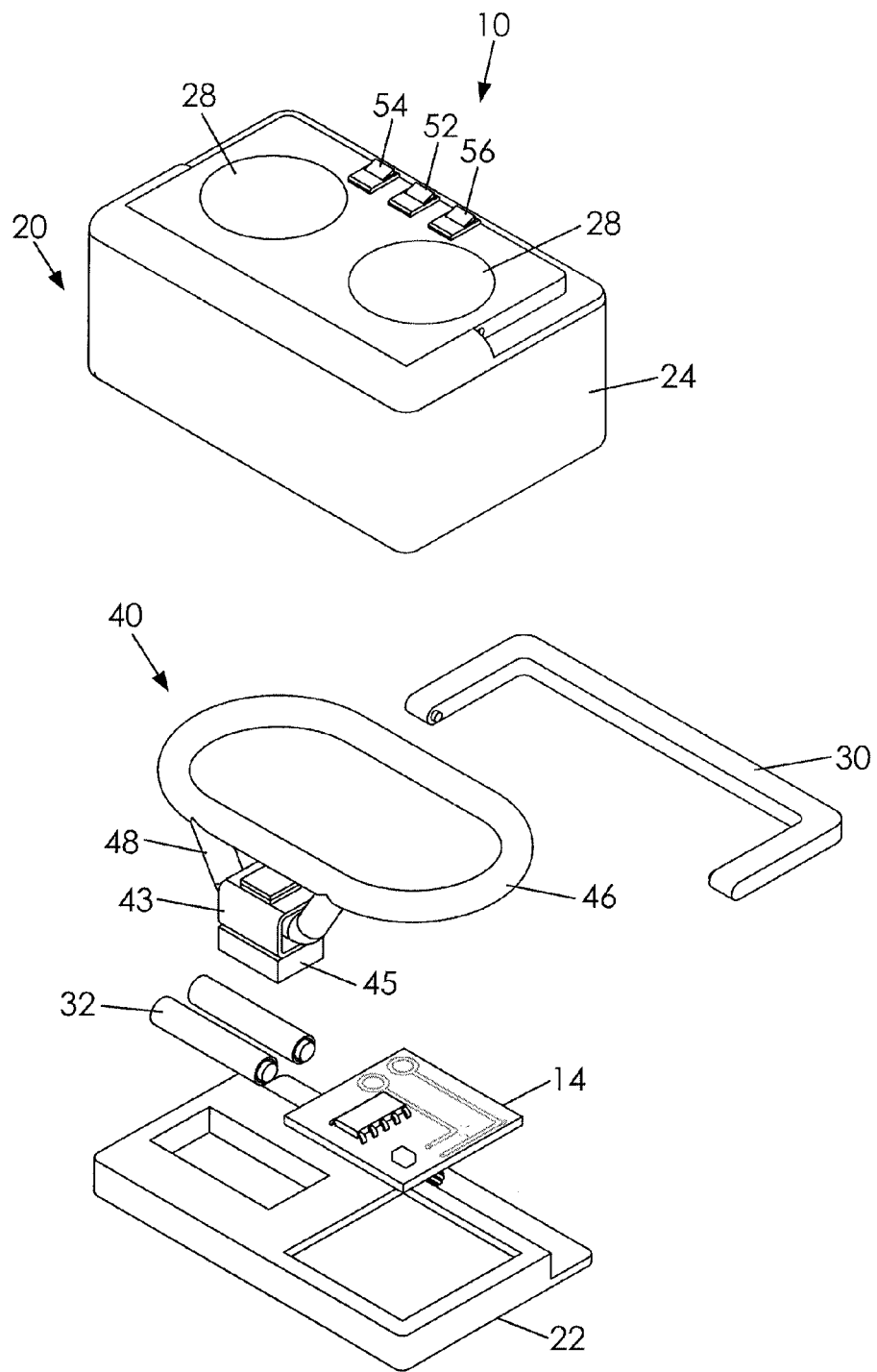
FIG. 3 is an exploded view of the apparatus as in FIG. 1b.

A beverage temperature control apparatus according to a preferred embodiment of the present invention will now be described with reference to FIGS. 1a to 8 of the accompanying drawings. The beverage temperature control apparatus 10 includes a housing 20 defining apertures 28 configured to receive a beverage container 12, a thermoelectric assembly 40 specifically configured to selectively cool or heat the beverage container 12, and user controls to select a desired function.

The housing 20 includes a bottom wall 22 and a plurality of side walls 24 extending upwardly from the bottom wall 22 in a box like configuration. A top wall 26 extends between upper edges of the side walls 24 so as to enclose the top of the housing 20. Together, the bottom, side, and top walls define an interior area. In an embodiment, one or more walls may be constructed of an insulated material. The top wall 26 defines at least one but preferably two apertures 28 dimensioned to receive a beverage container 12 substantially or almost completely into the interior area of the housing 20. It is understood that the beverage container 12 may be a mug, cup, insulated container, or even a fast food beverage container. Various embodiments of the present invention may be configured to accommodate these or other beverage containers.

The thermoelectric assembly 40 is situated in the interior area of the housing 20. As will be described in more detail below, the thermoelectric assembly 40 includes a first portion 42 that becomes cold when energized with current and a second portion 44 coupled to the first portion 42 that becomes warm when energized. A thermoelectric device that is capable of both heating and cooling is also referred to as a Peltier device or as causing a Peltier effect. More particularly, a Peltier device includes a pair of ceramic plates having a construction such that when energized with a DC power supply, one plates gets cold and the other plate gets hot. Peltier devices, however, are often dependent on particular applications.

The thermoelectric assembly 40 according to the present invention enables a beverage container 12 inserted into the interior area to be cooled or heated. An internal battery 32 or multiple DC batteries are situated in the interior area, such as in a recessed area along the bottom wall 22 and are electrically connected to the first portion 42 and second portion 44 of the thermoelectric assembly 40. Additional circuitry 14 may also be included to control the specific functionality of the thermoelectric assembly 40 as will be described later. The thermoelectric assembly 40 may also be energized by current from an automobile battery using a power cord 36 that extends from the housing 20, the power cord 36 having a free end configured to engage a cigarette lighter outlet which is electrically connected to the automobile battery 34.

The thermoelectric assembly 40 includes a primary channel 46 having a circuitous tubular configuration that defines an interior space containing a fluid. The primary channel 46 is situated adjacent the first portion 42 of the thermoelectric assembly 40. Specifically, only a relatively small length of the primary channel 46 may be adjacent the first portion 42 of the thermoelectric assembly 40 but is sufficient in that the fluid therein is influenced by the cold temperature produced by the first portion 42. Preferably, the fluid is just air although in some embodiments a liquid or another gas may be circulated through the primary channel 46.

Figure 4:
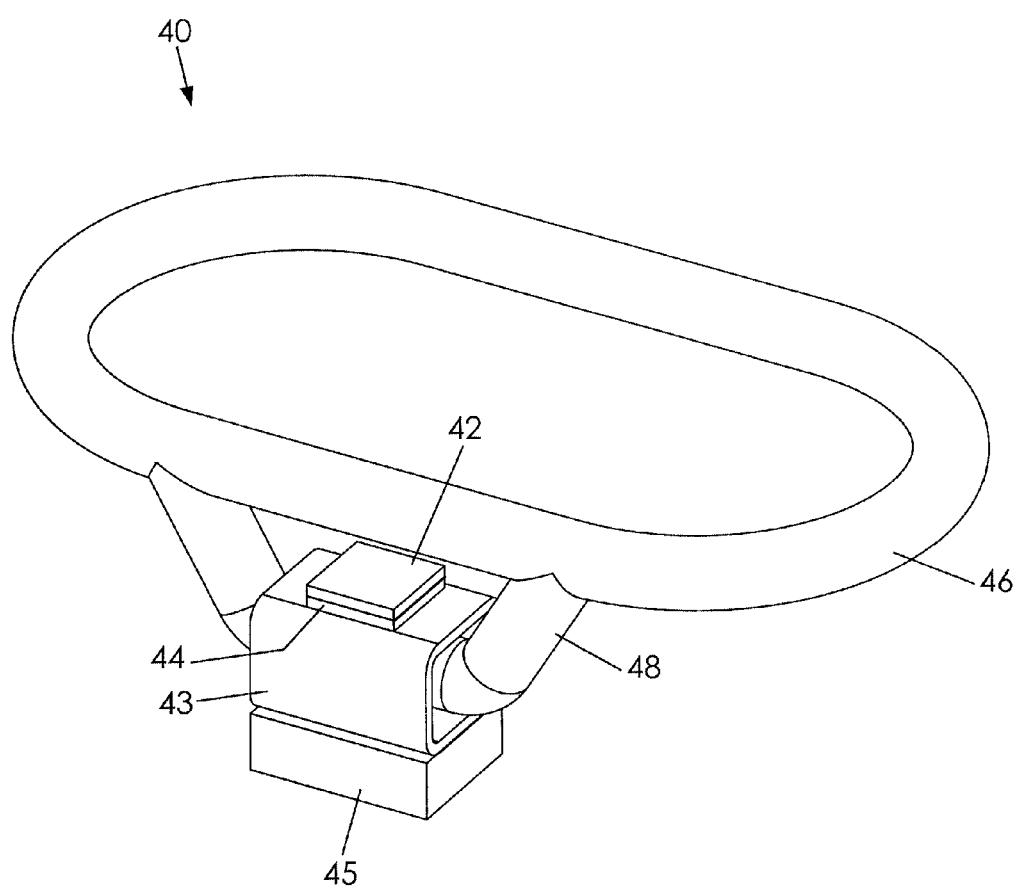
FIG. 4 is a perspective view of the apparatus with a thermoelectric assembly removed from the housing.

The thermoelectric assembly 40 also includes a secondary channel 48 having a tubular configuration that diverges away from the primary channel 46 even if only for a small expanse of the overall primary channel 46 (FIG. 4). Specifically, the secondary channel 48 includes a first junction just prior to the first 42 and second 44 portions and a second junction that reconnects with the primary channel 46 on the other side of the first 42 and second 44 portions. The secondary channel 48 is adjacent the second portion 44 of the thermoelectric assembly 40 such that fluid inside the secondary channel 48 is influenced by the heat generated by the second portion 44 when energized with current from the battery 32.

The functionality of thermoelectric assembly 40 is dependent on properly capturing either cold or hot temperatures generated by the first 42 and second 44 portions, respectively, and to minimizing the effect of the undesired temperatures thereof. In this regard, the fluid is directed or blocked from selected channels at a user's direction as described below.

Figure 5A:
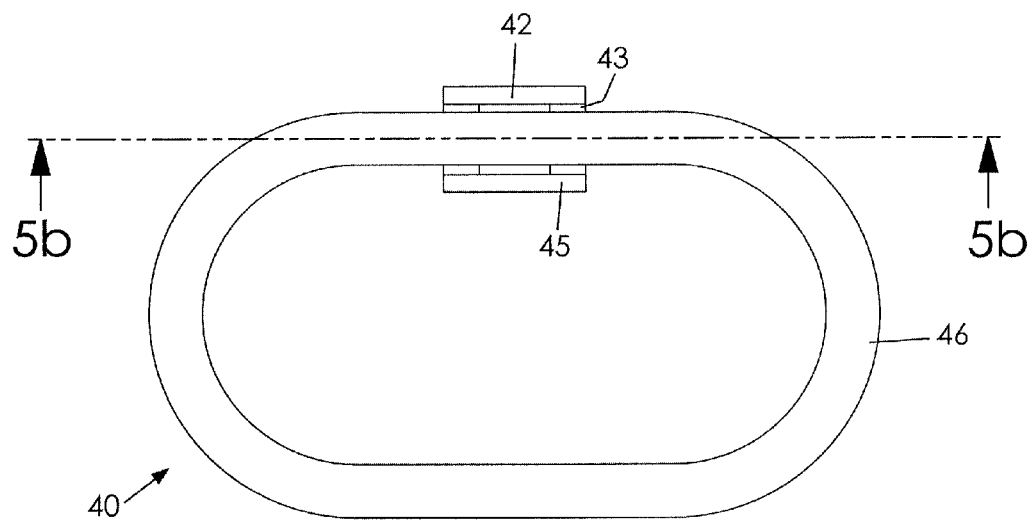
FIG. 5a is a top view of the thermoelectric assembly as in FIG. 4.
Figure 5B:
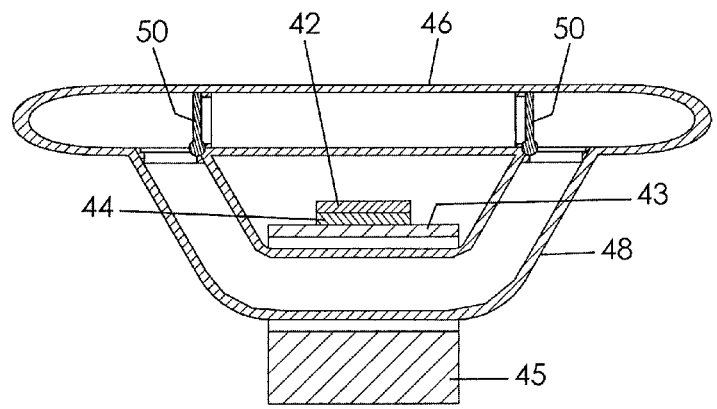
FIG. 5b is a sectional view taken along line 5b-5b of FIG. 5a illustrated with gates in an open configuration.
Figure 5C:
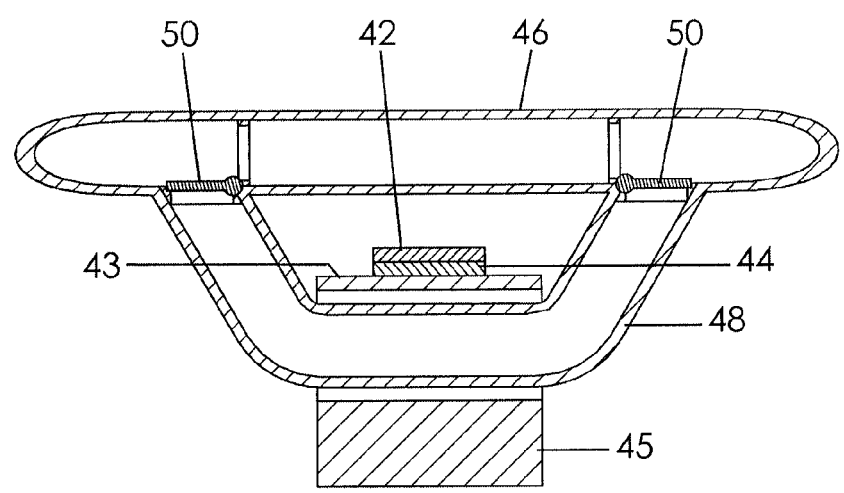
FIG. 5c is another sectional view as in FIG. 5b illustrated with the gates in a closed configuration.

The thermoelectric assembly 40 includes a pair of gates 50 situated at respective junctions where the secondary channel 48 diverges from the primary channel 46 (FIG. 5b). It is understood that each gate 50 may be mounted in the interior space of the primary channel 46 and movable between an open configuration in which fluid is directed into and through the secondary channel 48 (FIG. 5b) and a closed configuration in which fluid is prevented from passing into or through the secondary channel 48 (FIG. 5c). To be clear, fluid flows only through the primary channel 46 and adjacent the first portion 42 of the thermoelectric assembly 40 when the gates 50 are in the closed configuration. While the gates 50 may be pivotally mounted to an inner surface of the primary channel 46 and moved in the manner of a hinge, other gate configurations may be used, such as valves, louvers, slidable doors, or the like. Preferably, the gates 50 move together, either electrically or using a linkage (not shown). It is understood that when the gates are open and air is diverted to the secondary channel 48, the fluid is only diverted in the area adjacent the first 42 and second 44 portions of the thermoelectric assembly 40.

A user of the beverage temperature control apparatus 10 is able to select whether to cool a beverage container 12, to heat the beverage container 12, to power the apparatus 10 using an automobile's battery (also referred to as an external battery 34, or to power the apparatus 10 using an internal battery 32 such as when carrying the apparatus 10 away from the car. A series of input switches may be positioned atop the top wall 26 of the housing 20.

Specifically, a first input switch 52 is in electrical communication with the pair of gates 50 and configured to actuate the gates to move between open and closed configurations, respectively, as described above. The first input switch 52 may be toggled between "hot" and "cold" positions corresponding to the open and closed configurations of the pair of gates 50, respectively. The first input switch 52 may be electrically connected directly to the gates 50, such as with wires (not show), or operatively through a circuit board 14 having a processor or control circuit (i.e. a "controller").

A second input switch 54 may be positioned on the housing 20 and electrically connected to the internal battery 32, the second input switch 54 being configured to actuate the battery 32 to energize the thermoelectric assembly 40. Accordingly, the heating or cooling of a beverage container 12 is on-demand and does not utilize battery power when not needed. Further, a third input switch 56 may be positioned adjacent the aforementioned input switches and is configured to actuate the power cord 36 to deliver current to energize the thermoelectric assembly 40. Preferably, a user will choose to utilize current from the vehicle's battery 34 when the apparatus 10 is used inside the vehicle and save the charge of the internal battery 32 for when the housing 20 is carried outside the vehicle.

With further attention to the thermoelectric assembly 40, a conduction member 43 is mounted within the interior area of the housing 20 adjacent the secondary channel 48. The conduction member 43 may be described as a bracket, an upper surface of the conduction member 43 being in direct communication with the second portion 44 (i.e. the "hot side") of the thermoelectric assembly 40. It is understood that the conduction member 43 is constructed of a material that effectively conducts heat. Preferably, the conduction member 43 is shaped to completely surround the secondary channel 48 such that fluid in the secondary channel 48 is significantly and efficiently influenced by heat produced by the second portion 44 of the thermoelectric assembly 40.

Further, a fan 45 is positioned downwardly adjacent a lower surface of the conduction member 43. The fan 45 is electrically connected to the internal battery 32. The fan 45, therefore, is configured to dissipate the heat that is conducted from the second portion 44. Preferably, the fan 45 is energized when the first input switch 52 causes the gates 50 to close—which indicates a desire to cool a beverage container 12. In other words, heat is dissipated in order to maximize the cooling effect of the thermoelectric assembly 40. By contrast, the heat is not dissipated when the desire is to maximize heating of the secondary channel 48.

In another aspect, the housing 20 includes a handle 30 operatively coupled to the plurality of side walls 24 and that is configured to support the housing 20 when lifted upwardly by a user. The handle 30 may be pivotally movable between a storage or folded configuration and an extended use configuration. The handle 30 enables a user to carry the housing 20.

Figure 6A:
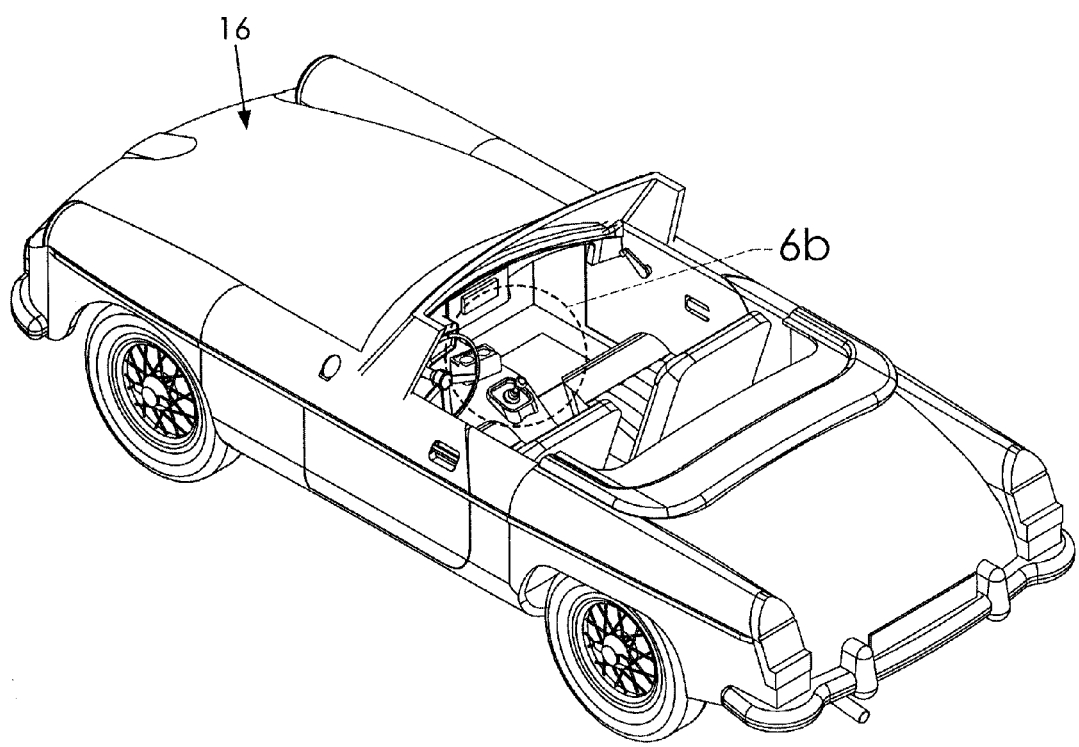
FIG. 6a is a perspective view of the apparatus as in FIG. 1 in use with an automobile.
Figure 6B:
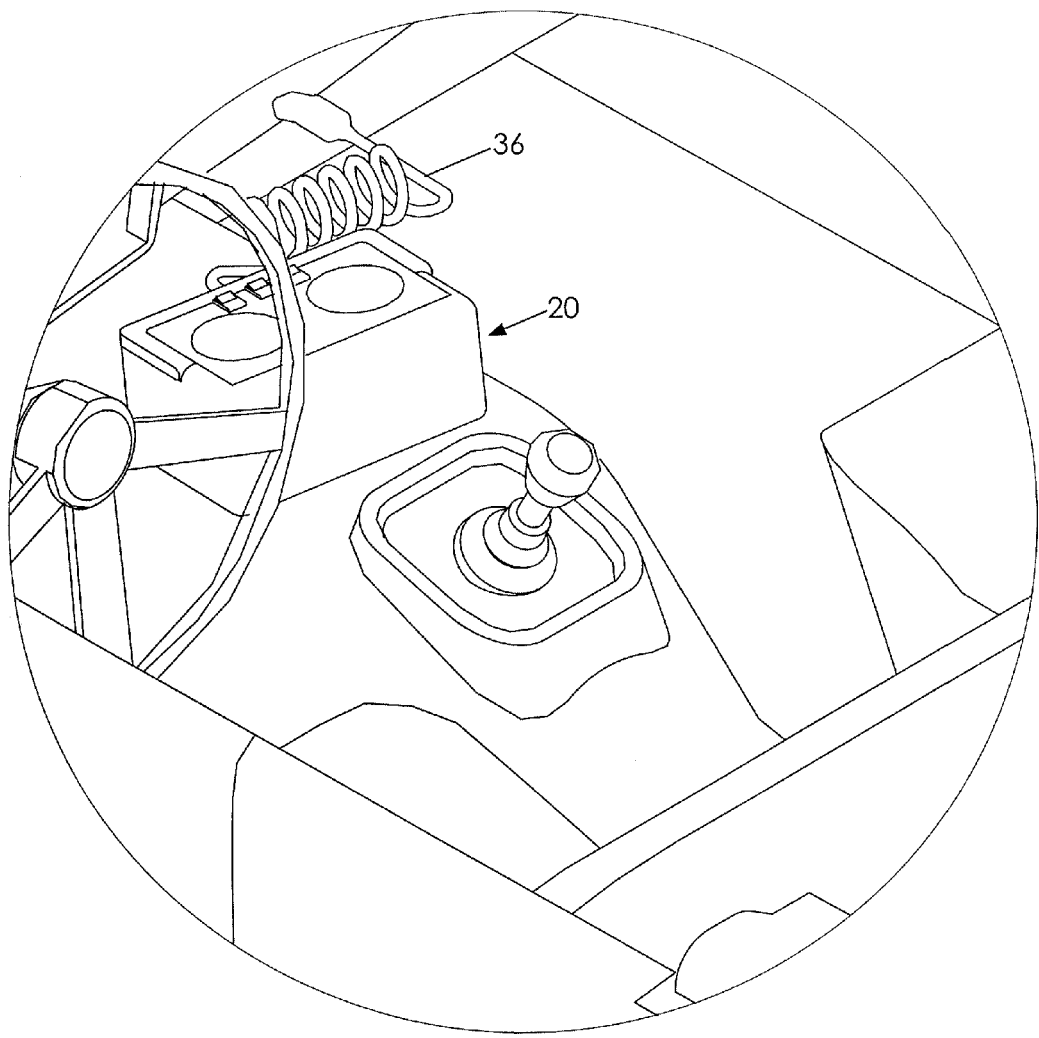
Figure 7A:
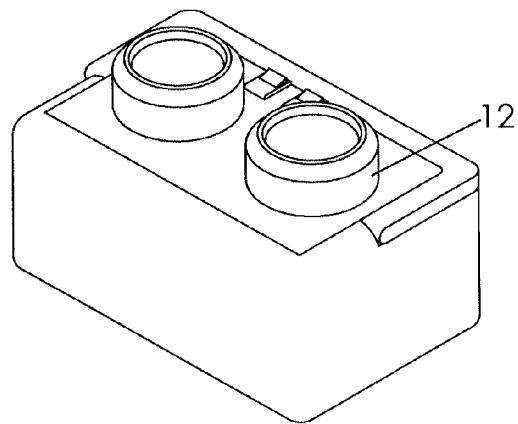
FIG. 7a is a perspective view of the apparatus as in FIG. 1 illustrated with a pair of beverage containers inserted therein.
Figure 7B:
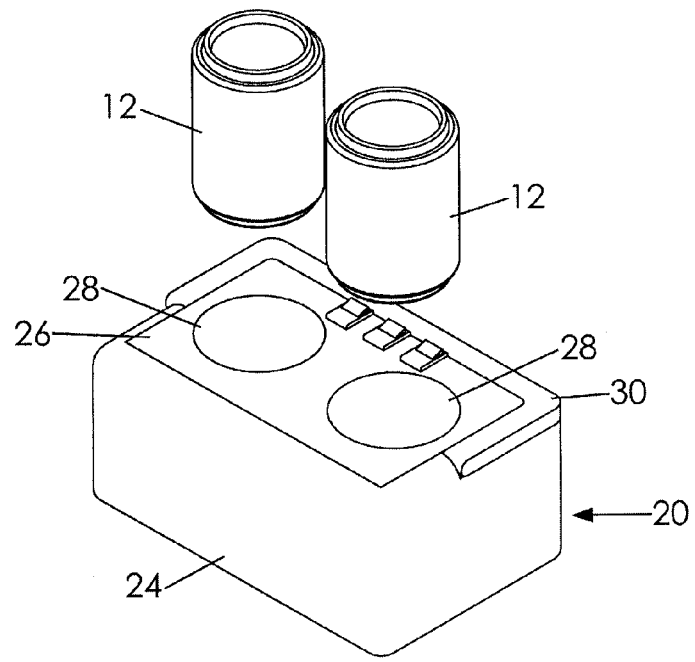
FIG. 7b is an exploded view of the apparatus as in FIG. 7a with the beverage containers exploded therefrom.
Figure 8:
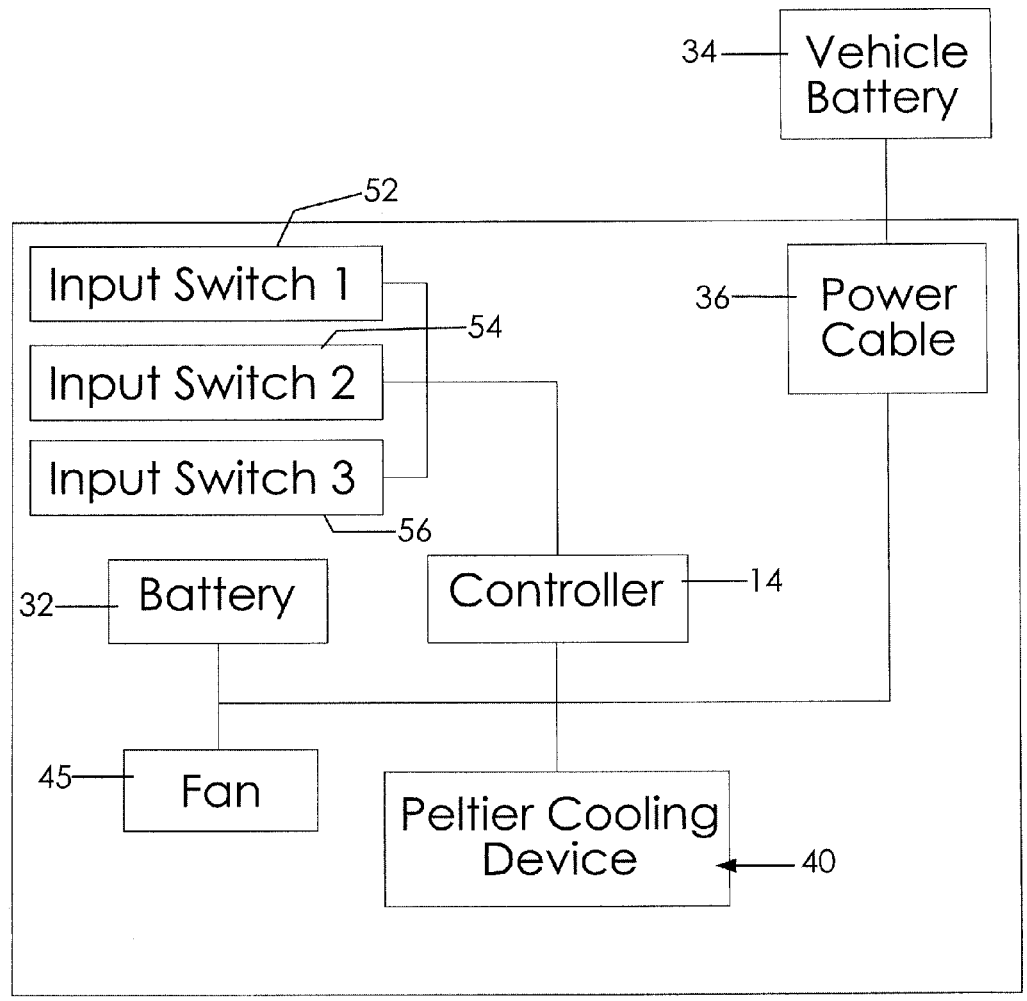
FIG. 8 is a block diagram illustrating the electronic components of the apparatus according to the present invention.

In use, the housing 20 of the beverage temperature control apparatus 10 may be comfortably positioned in the passenger cab of an automobile 16 (FIGS. 6a and 6b). The free end of the power cord 36 may then be electrically coupled to the automobile battery 34 through the cigarette lighter outlet. Power through the power cord 36 may be selected using the third input switch 56. One or more beverage containers 12 may be inserted into the interior area of the housing 20 (FIG. 7b). When desired, a user may actuate the thermoelectric assembly 40 using the second input switch 54 and may select if heating or cooling of the beverage containers 12 is desired using the first input switch 52. If desired, a user can remove the housing 20 from the automobile 16 by disconnecting the power cord 36 and using the handle 30. However, cooling or heating of the beverage containers 12 may continue using current from the internal battery 32 as described above.

It is understood that while certain forms of this invention have been illustrated and described, it is not limited thereto except insofar as such limitations are included in the following claims and allowable functional equivalents thereof.

The invention claimed is:

1. A beverage temperature control apparatus for use in holding and maintaining a temperature of a beverage container in or proximate an automobile, comprising:
    a housing having a bottom wall and a plurality of side walls extending upwardly from said bottom wall and a top wall extending across upper edges of said plurality of side walls, said bottom, side, and top walls defining an interior area;
    wherein said top wall defines an aperture in communication with said interior area, said aperture having a shape substantially similar to a configuration of the beverage container and in selective receipt the beverage container in the interior area;
    a thermoelectric assembly situated in said interior area of said housing proximate said aperture, said thermoelectric assembly having a first portion that becomes cold when energized and a second portion that becomes warm when energized;
    a power cord electrically connected to said thermoelectric assembly and extending outside said housing, said power cord selectively receiving current from a power source associated with the automobile so as to energize said thermoelectric assembly when positioned in the automobile;
    a battery configured to power said thermoelectric assembly when remote from said automobile, situated in said interior area of said housing that is electrically connected to said thermoelectric assembly and is selectively actuated to energize said thermoelectric assembly;
    wherein said housing includes a handle operatively coupled to said plurality of side walls and that is configured to support said housing when lifted upwardly by a user;
    wherein said thermoelectric assembly includes:
        a primary channel having a circuitous tubular configuration that defines a first interior space containing a fluid, said primary channel being situated adjacent said first portion of said thermoelectric assembly;
        a secondary channel diverging from said primary channel that defines a second interior space containing said fluid, said second channel being situated adjacent said second portion of said thermoelectric assembly;
    wherein said thermoelectric assembly includes a pair of gates situated at respective junctions where said secondary channel diverges from said primary channel, said pair of gates being selectively movable between a closed configuration in which said fluid is directed through said primary channel contacting said first portion of said thermoelectric assembly, thereby said fluid releases heat to the first portion of said thermoelectric assembly and thereafter said fluid cools said interior space and said container, and an open configuration in which said fluid is directed through said secondary channel contacting said second portion of said thermoelectric assembly, thereby said fluid absorbs heat from the second portion of the thermoelectric assembly and thereafter said fluid heats said interior space and said container;
    a first input switch situated on said top wall of said housing and in electrical communication with said pair of gates that selectively actuates said pair of gates to move between said open and closed configurations, said first input switch being selectively toggled between hot and cold positions corresponding to said open and closed configurations of said pair of gates;
    a second input switch situated on said top wall of said housing and in electrical communication with said battery that selectively actuates said battery to energize said thermoelectric assembly;
    a third input switch situated on said top wall of said housing and in electrical communication with said power cord that selectively actuates said power cord to energize said thermoelectric assembly with current from the power source associated with the automobile.

2. The beverage temperature control apparatus as in claim 1, wherein said conduction member surrounds said secondary channel such that heat conducted between said second portion of said thermoelectric assembly influences a temperature of said fluid in said secondary channel.

3. The beverage temperature control apparatus as in claim 1, wherein said thermoelectric assembly includes:
    a conduction member adjacent said secondary channel and in direct communication with said second portion; and
    a fan situated proximate a lower side of said conduction member and electrically connected to said battery, said fan configured to dissipate heat from said conduction member when energized;

wherein said fan is energized when said first switch is positioned to actuate said pair of gates to said closed configuration.

4. The beverage temperature control apparatus as in claim 1, wherein said power cord includes a plug configured to interface with an automobile battery through an automobile cigarette lighter outlet.

* * * * *